(12) United States Patent
Murphy

(10) Patent No.: US 9,150,361 B2
(45) Date of Patent: Oct. 6, 2015

(54) FOLDABLE CONVEYOR SUPPORT STRUCTURE

(75) Inventor: Glenn Murphy, Craigavon (GB)

(73) Assignee: TEREX GB Limited, Craigavon (GB)

( * ) Notice: Subject to any disclaimer, the term of this patent is extended or adjusted under 35 U.S.C. 154(b) by 0 days.

(21) Appl. No.: 14/119,973

(22) PCT Filed: May 24, 2012

(86) PCT No.: PCT/EP2012/059741
§ 371 (c)(1),
(2), (4) Date: Nov. 25, 2013

(87) PCT Pub. No.: WO2012/160152
PCT Pub. Date: Nov. 29, 2012

(65) Prior Publication Data
US 2014/0124330 A1    May 8, 2014

(30) Foreign Application Priority Data

May 26, 2011   (GB) .................................. 1108902.6

(51) Int. Cl.
| | |
|---|---|
| *B65G 21/10* | (2006.01) |
| *B65G 41/00* | (2006.01) |
| *B65G 21/14* | (2006.01) |
| *B65G 41/02* | (2006.01) |

(52) U.S. Cl.
CPC .............. *B65G 41/001* (2013.01); *B65G 21/10* (2013.01); *B65G 21/14* (2013.01); *B65G 41/002* (2013.01); *B65G 41/005* (2013.01); *B65G 41/008* (2013.01); *B65G 41/02* (2013.01)

(58) Field of Classification Search
CPC .... B65G 41/001; B65G 41/02; B65G 41/005; B65G 41/002; B65G 21/10; B65G 21/14
USPC ........ 198/313, 315, 316.1, 317, 861.2, 861.6, 198/586, 588
See application file for complete search history.

(56) References Cited

U.S. PATENT DOCUMENTS

| | | | | |
|---|---|---|---|---|
| 3,841,464 | A * | 10/1974 | Tome ......................... | 198/861.2 |
| 4,183,158 | A * | 1/1980 | Satterwhite ..................... | 37/190 |
| 5,333,725 | A * | 8/1994 | Douglas ....................... | 198/632 |
| 6,662,939 | B1 * | 12/2003 | McCusker et al. ......... | 198/861.1 |
| 8,113,332 | B2 * | 2/2012 | Devlin et al. ................. | 198/313 |
| 2006/0180436 | A1 * | 8/2006 | Heeszel et al. ................ | 198/587 |

* cited by examiner

*Primary Examiner* — Leslie A Nicholson, III
(74) *Attorney, Agent, or Firm* — Warner Norcross & Judd LLP

(57) ABSTRACT

A conveyor support structure for an aggregate processing apparatus, the support structure comprising a base section and a deployable boom structure. The boom structure includes a mid-section pivotably coupled to the base section, and a head section pivotably coupled to the mid-section. When the boom structure adopts a transport state, the mid-section extends at an angle of approximately 45° with respect to the ground surface. A pair of crossed head section supports are pivotably coupled between the base section and the head section and serve to guide the movement of the boom structure.

38 Claims, 5 Drawing Sheets

FOLDABLE CONVEYOR SUPPORT STRUCTURE

FIELD OF THE INVENTION

The present invention relates to foldable support structures for conveyors, especially belt conveyors. The invention relates particularly but not exclusively to foldable conveyors for aggregate and other processing apparatus.

BACKGROUND TO THE INVENTION

Material processing apparatus may include a plurality of conveyors for transporting aggregate or other material to or from the apparatus. Typically, the conveyors include one or more side conveyors, which extend laterally from the processing apparatus during use. A problem with such conveyors is that transporting or moving the material processing apparatus can be difficult or impossible when they are deployed. For example, when being carried by a transport vehicle, the material processing apparatus must fit onto or into the vehicle as well as complying with any height and/or width restrictions that may be applicable to public roads. To this end, side conveyors are often provided with a foldable support structure that allows them to be folded between the deployed state and a more compact transport state. United Kingdom Patent GB2351719 discloses an example of a side conveyor with a foldable support structure. A problem with the conveyor of GB2351719 is that it does not readily allow another conveyor, for example an auxiliary conveyor, to be mounted beside it.

A further problem with such conveyors is the susceptibility of their component parts to damage or failure resulting from, for example, the ingress of dirt during use.

It would be desirable to provide an improved foldable support structure for a conveyor that mitigates the problems outlined above.

SUMMARY OF THE INVENTION

A first aspect of the invention provides a conveyor support structure for an aggregate or other material processing apparatus, the conveyor support structure comprising a base; a boom structure pivotable with respect to the base between a transport state, in which said boom structure is substantially disposed in a first plane, and a deployed state, in which said boom structure is substantially disposed in a second plane, said second plane being non-parallel with said first plane, wherein the boom structure comprises a mid-section pivotably coupled to the base, and a head section pivotably coupled to the mid-section;

a mid-section support pivotably coupled to the base and to the mid-section, the mid-section support being extendible and comprising a powered actuator for effecting extension and retraction thereof; and means for guiding and supporting said head section as said boom structure is moved between said deployed and transport states, wherein, when said boom structure is in said transport state, said mid-section is substantially disposed in said first plane and extends obliquely from said base, and wherein, preferably, said guiding means comprises at least one head section support pivotably coupled to the base and to the head section, said at least one head section support comprising a first head section support comprising a support member that is non-extending (or of substantially constant length) when guiding and supporting said boom structure between the deployed and transport states.

A second aspect of the invention provides a conveyor comprising the conveyor support structure of the first aspect of the invention adapted to receive a conveyor belt; and a conveyor belt fitted to the support structure.

A third aspect of the invention provides an aggregate or other material processing apparatus comprising a conveyor having the conveyor support structure of the first aspect of the invention.

A fourth aspect of the invention provides a conveyor support structure for an aggregate or other material processing apparatus, the conveyor support structure comprising a base; a boom structure pivotable with respect to the base between a transport state, in which said boom structure is substantially disposed in a first plane, and a deployed state, in which said boom structure is substantially disposed in a second plane, said second plane being non-parallel with said first plane, wherein the boom structure comprises a mid-section pivotably coupled to the base, and a head section pivotably coupled to the mid-section;

a mid-section support pivotably coupled to the base and to the mid-section, the mid-section support being extendible and comprising a powered actuator for effecting extension and retraction thereof; and means for guiding and supporting said head section as said boom structure is moved between said deployed and transport states, wherein, when said boom structure is in said transport state, said mid-section is substantially disposed in said first plane and extends obliquely from said base, and wherein, when said boom structure is in said transport state, said mid section extends obliquely from said base at an angle of between approximately 35° and approximately 55°, preferably between approximately 40° and approximately 50°, and most preferably substantially 45° from a transverse axis of said base.

A fifth aspect of the invention provides a conveyor comprising the conveyor support structure of the fourth aspect of the invention adapted to receive a conveyor belt; and a conveyor belt fitted to the support structure.

A sixth aspect of the invention provides an aggregate or other material processing apparatus comprising a conveyor having the conveyor support structure of the fourth aspect of the invention.

A seventh aspect of the invention provides a dual segment offset-stored conveyor comprising: a proximal segment coupled in close proximity to the frame of a material processing apparatus, and a distal segment, which is distal to said frame and substantially parallel to the longitudinal axis of the apparatus when stored; means for guiding and supporting said dual segment offset stored conveyor from a use position which is preferably substantially orthogonal to said longitudinal direction to a stored position where said proximal segment is oriented at a substantially 45 degree angle with respect to said longitudinal direction.

An eighth aspect of the invention provides a mobile aggregate processing apparatus comprising in operative combination:

a frame having a longitudinal direction: a first material processing plant configured to perform at least one of feeding material, washing material, sorting material into first predetermined material dimension groups and crushing material with a first larger dimension characteristic into material having a first smaller dimension characteristic; a second material processing plant configured to perform at least one of feeding material, washing material, sorting material into second predetermined material dimension groups and crushing material with a second larger dimension characteristic into material having a second smaller dimension characteristic; a main conveyor coupling an output of one of said first material processing plant and said second material processing plant with another of said first material processing plant and said second material processing plant; preferably an end conveyor coupled to one of said first material processing plant and said second material processing plant; an auxiliary conveyor coupled to and stored in a transport position substantially parallel with said longitudinal direction; a dual segment offset stored conveyor having a proximal segment coupled in close proximity to said frame and a distal segment which is distal to said frame when deployed and substantially parallel to said longitudinal direction when stored; means for guiding and supporting said dual segment offset stored conveyor from a use position which is preferably substantially orthogonal to said longitudinal direction to a stored position where said proximal segment is oriented at a substantially 45 degree angle with respect to said longitudinal direction, so that said distal segment is offset with respect to said auxiliary conveyor Preferred features are recited in the dependent claims.

Further advantageous aspects of the invention will become apparent to those ordinarily skilled in the art upon review of the following description of a preferred embodiment and with reference to the accompanying drawings.

BRIEF DESCRIPTION OF THE DRAWINGS

An embodiment of the invention is now described by way of example and with reference to the accompanying drawings in which.

DETAILED DESCRIPTION OF THE DRAWINGS

Figure 1:
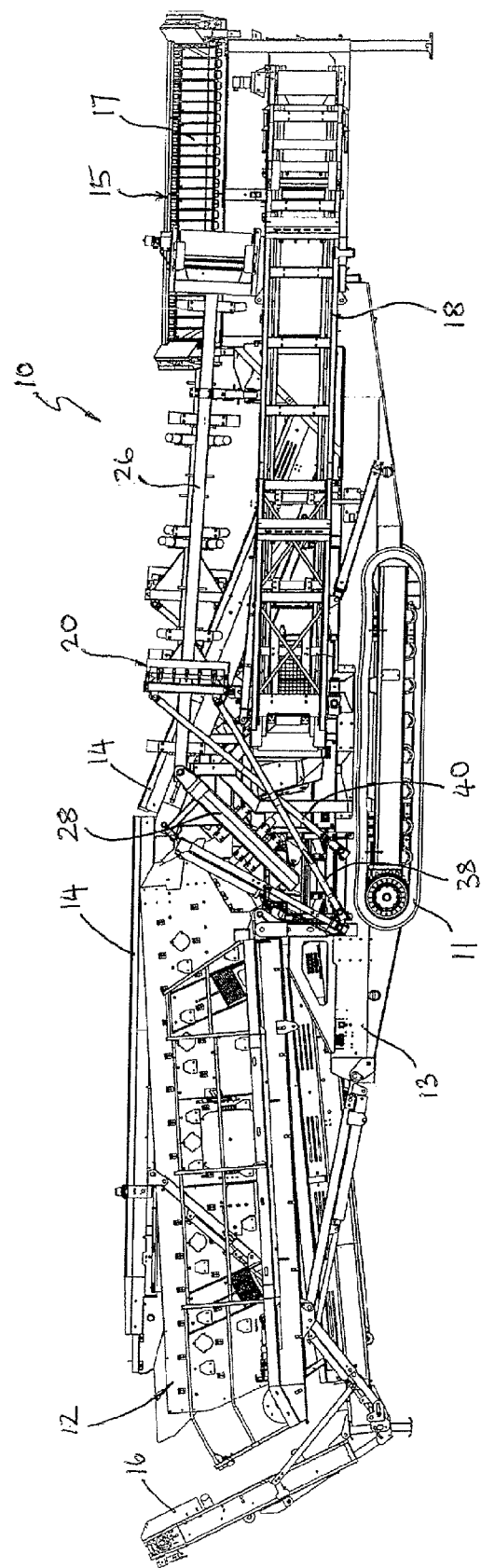
FIG. 1 is a side view of a mobile aggregate processing apparatus including a support structure embodying the invention.
Figure 2:
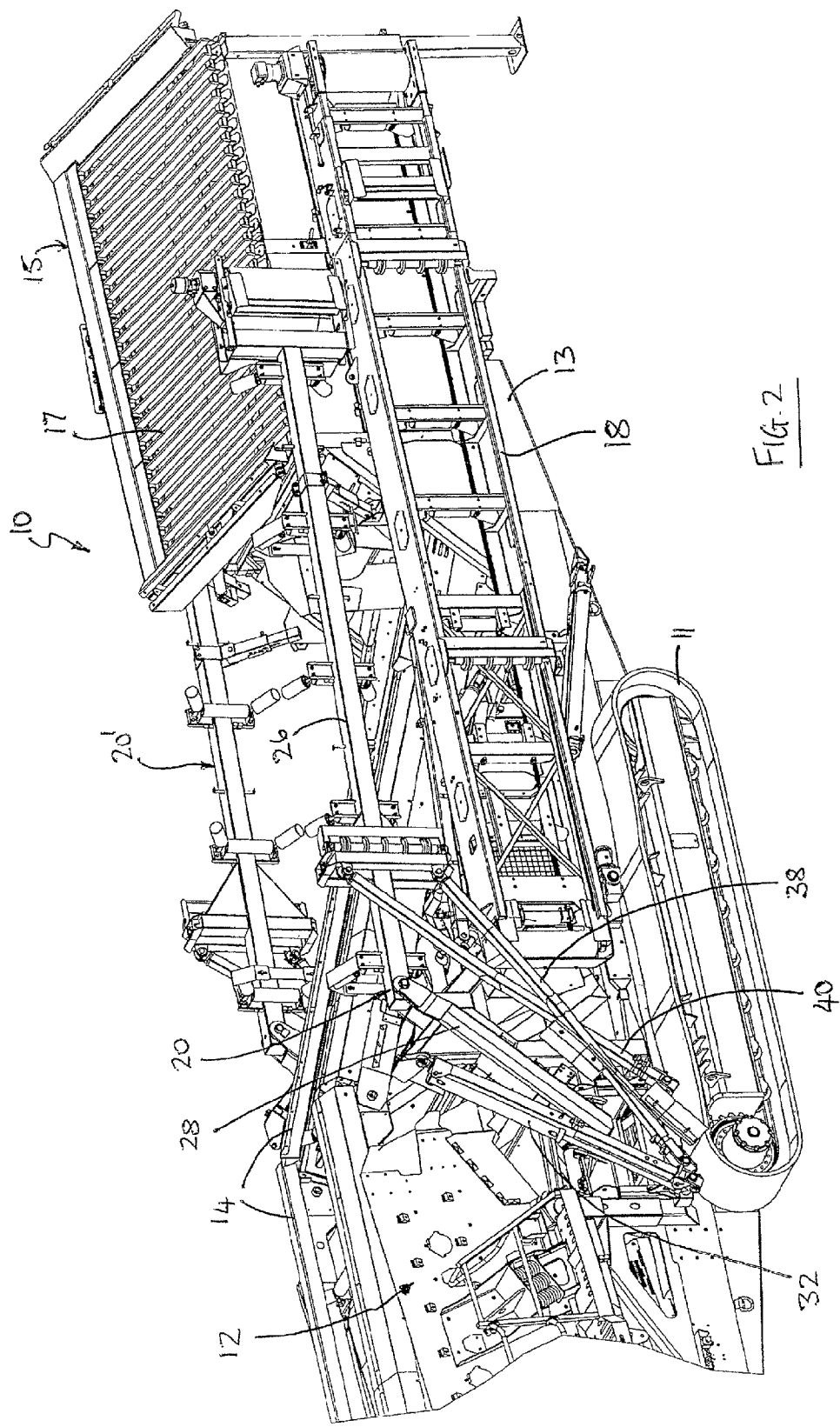
FIG. 2 is a perspective partial view of the processing apparatus of FIG. 1.

Referring now to FIGS. 1 and 2 of the drawings, there is shown, generally indicated as 10, an aggregate or other material processing apparatus. The aggregate processing apparatus 10 is configured for performing, by way of example, aggregate or other material screening and, as such, comprises a screening plant in particular an aggregate screening plant 12. Alternatively, however, the apparatus 10 may be configured to perform any one or more of a plurality of processes, such as feeding, screening, separating, crushing and/or washing, on one or more types of aggregate material, for example rocks, stones, gravel, sand and/or soil, or any other material that is quarried, mined or excavated. To this end, the apparatus 10 may include one or more material processing plants adapted to perform one or more of the foregoing processes.

Typically, the processing apparatus 10 is mobile and comprises one or more wheels and/or tracks 11 mounted on a chassis 13. The apparatus 10 is usually self-propelled and to this end may comprise a drive system (not shown), e.g. comprising an engine, for driving the wheels or tracks 11 as applicable. In cases where the apparatus 10 is towable, it is usually provided with wheels for this purpose.

In the illustrated example, the processing apparatus 10 comprises a plurality of conveyors, including a main conveyor 14, an end conveyor 16 and an auxiliary conveyor 18, for transporting aggregate or other material to and from the apparatus 10, and in particular to and from the screening apparatus 12. In this example, the main conveyor 14 carries aggregate from material processing plant in the form of a feed hopper 15 to the screening apparatus 12, the screened material being output from the apparatus 10 by one or more of the conveyors 16, 18 and/or one or more side conveyors to be described in further detail hereinafter. In this example, the feed hopper 15 includes a grid 17, which is typically raked, adapted to reject aggregate material that is unsuitable, e.g. too large, for processing by the apparatus 10. The conveyors 14, 16, 18 are usually belt-type conveyors, although the belts are not shown in the drawings. Typically, each of the conveyors 14, 16, 18 is configurable to adopt a transport state and a use state, the respective transport states being depicted in the drawings.

The processing apparatus 10 further includes a conveyor support structure 20 embodying one aspect of the present invention. In preferred embodiments, the conveyor support structure 20 forms part of a side conveyor that is located at a side of the apparatus 10 and is deployable to extend outwardly from the apparatus 10, typically in a direction that is substantially perpendicular to the longitudinal axis of the apparatus 10, although it may alternatively extend obliquely with respect to the longitudinal axis of the apparatus 10 when deployed. In FIGS. 1 and 2, the support structure 20 is shown in a folded, or transport, state corresponding to a folded, or transport, state of the side conveyor. In the transport state, the support structure 20 is folded substantially against the apparatus 10 and preferably extends in a direction that is substantially parallel with the longitudinal axis of the apparatus 10. Side conveyors are typically belt-type conveyors and so the support structure 20 is configured to allow a conveyor belt (not shown) to be fitted thereto, as is described in more detail hereinafter.

In this example, a second conveyor support structure 20' is located on the opposite side of the apparatus 10. The second support structure 20' may be the same as the support structure 20 and so the same description may be applied as would be apparent to a skilled person.

It will be understood that the invention is not limited to side conveyors. More generally, a conveyor support structure embodying the invention is suitable for use with a conveyor that is deployable between a deployed state, in which it extends outwardly from a host apparatus, and a folded state, in which it is folded substantially against the host apparatus. For example, conveyor support structures embodying the invention may be used with conveyors located at an end of the apparatus 10.

Figure 3:
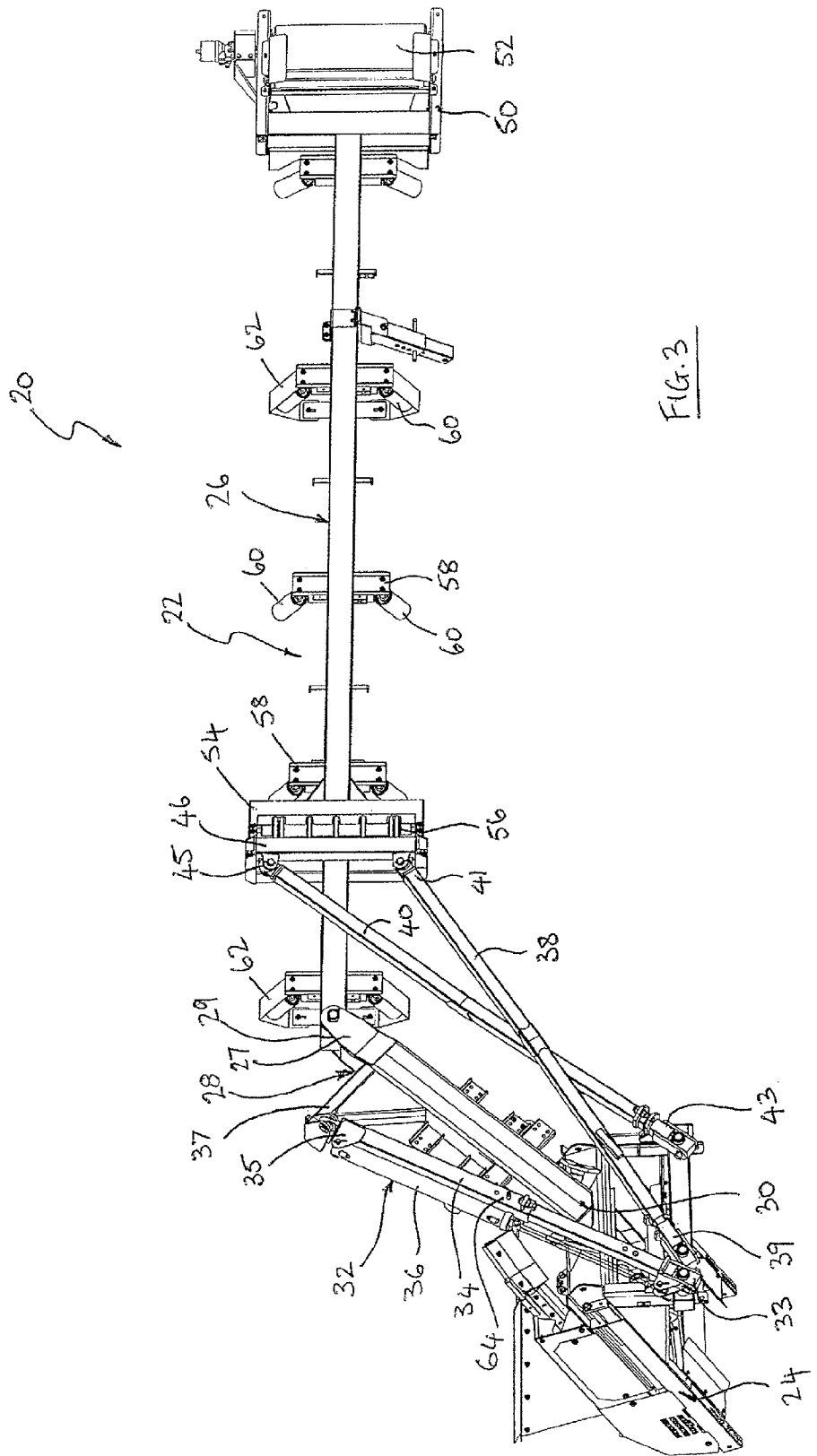
FIG. 3 is a perspective view of the support structure included in FIG. 1, shown separately from the aggregate processing apparatus and in a transport state.
Figure 4:
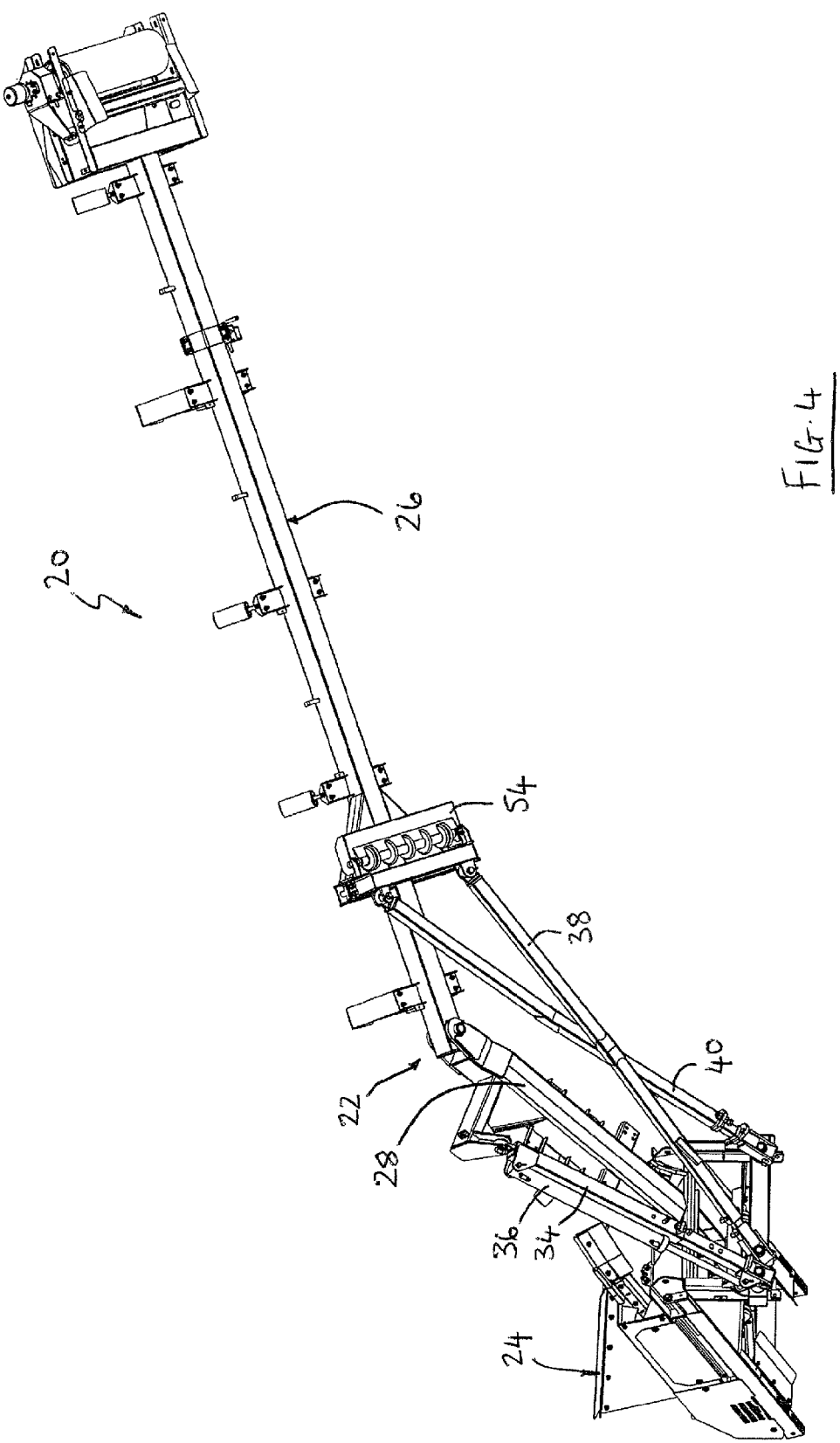
FIG. 4 is a perspective view of the support structure of FIG. 3, shown intermediate the transport and deployed states.
Figure 5:
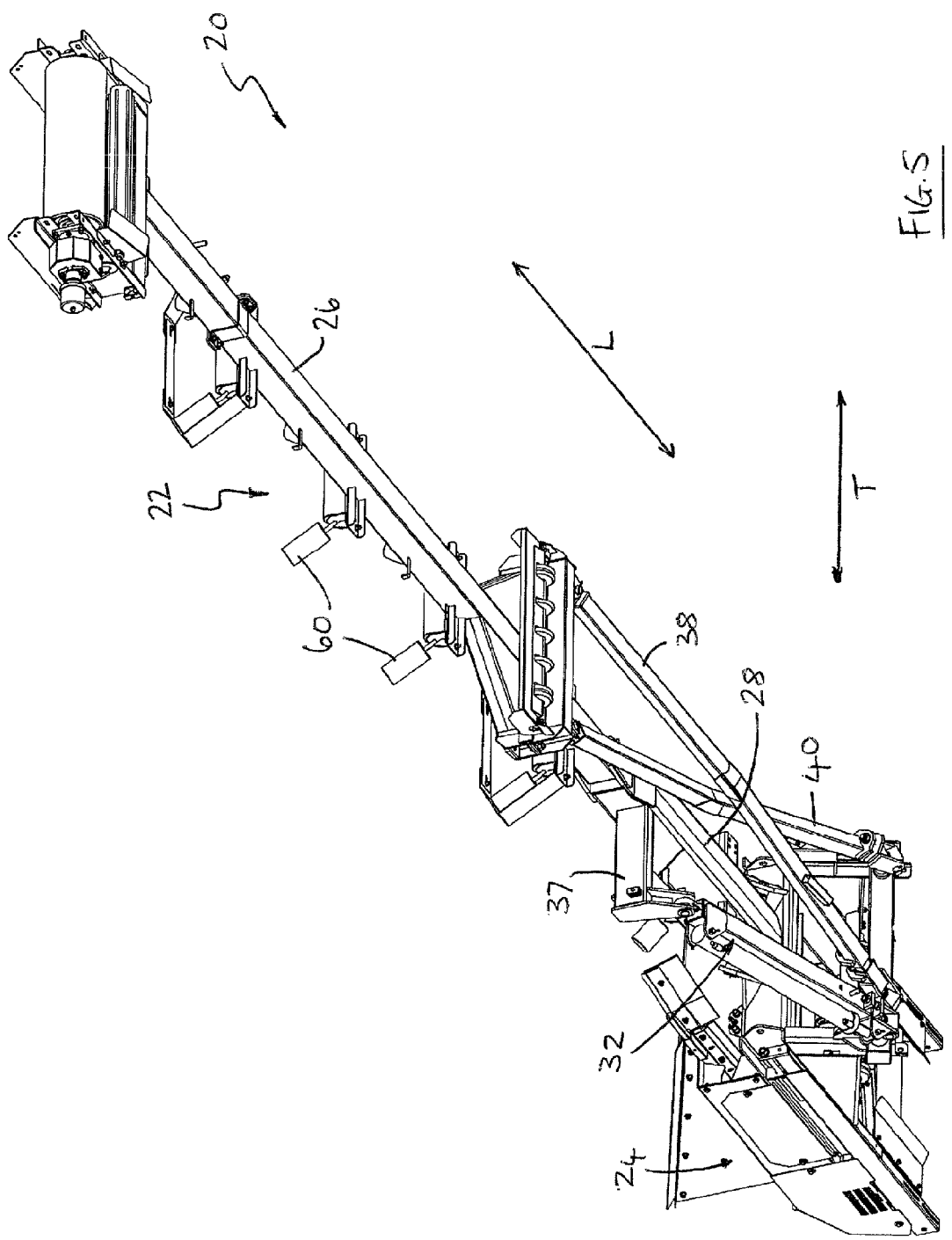
FIG. 5 is a perspective view of the support structure of FIGS. 3 and 4, shown in a deployed state.

Referring now in particular to FIGS. 3 to 5, the conveyor support structure 20 is described in more detail. The conveyor support 20 includes a boom structure 22 that is pivotable with respect to a base section 24 between a folded, or transport, state (FIG. 3) and a deployed state (FIG. 5), which correspond respectively to the transport and deployed states of the conveyor of which the support structure 20, in use, forms part. The base section 24 is mountable, preferably removably, on the apparatus 10 or other host apparatus. Alternatively, the base section 24 may be integrally formed with the apparatus 10 or other host apparatus.

The boom structure 22 comprises a head section 26 and a mid-section 28, the mid-section 28 being located between the head section 26 and the base section 24. The head section 26 and mid-section 28 are pivotably coupled to one another, preferably at respective ends 27, 29. The coupling, which may comprise any suitable conventional coupling or joint, is configured to allow relative pivotable movement between the sections 26, 28 about at least one axis, preferably only one axis. In the preferred embodiment, the pivot axis is substantially perpendicular to the plane in which the conveyor lies when deployed.

The conveyor support structure 20 may be adapted to carry a conveyor in any suitable manner. In this example, it is assumed that the conveyor comprises a conveyor belt (not shown). To this end, the head section 26 comprises a roller support 50 at its free end, the roller support carrying a conveyor end drum 52. The base section 24 also includes a roller support (not visible) for carrying a conveyor end drum (not visible). One or more of the head section 26, mid-section 28 and base section 24 may include one or more roller supports with one or more rollers, e.g. idler rollers. In the illustrated embodiment, the head section 26 includes a roller support 54 with an idler roller 56, which traverse the body of the head section 26. One or more of the head section 26, mid-section 28 and base section 24 may include one or more roller supports 58 with one or more troughing rollers 60 and, optionally, a belt retainer 62. When fitted, the conveyor belt extends between the end rollers in an endless loop, the top flight of which is shaped by the troughing rollers 60 when the conveyor is deployed.

In the preferred embodiment, the head section 26 and mid-section 28 each comprises a respective beam, the beams being located end-to-end and pivotably coupled to one another in the manner described above. Alternatively, either one or both of the sections 26, 28 may comprise a frame or other support member. Preferably, the head section 26 and mid-section 28 are substantially disposed in a mutually common plane in both the deployed and transport states.

The mid-section 28 is pivotably coupled to the base section 24, preferably at its end 30, opposite end 27. The coupling, which may comprise any suitable conventional coupling or joint, is configured to allow relative pivotable movement between the mid-section 28 and the base section 24 about at least one axis. In the preferred embodiment, the mid-section 28 is pivotable about a single axis that is oblique with respect to the three orthogonal main axes of the apparatus 10, arranged to allow the mid-section 28 to pivot between a folded state (FIGS. 1, 2 and 3) in which it is located substantially against the apparatus 10, and a deployed state in which it projects from the apparatus 10, preferably substantially perpendicularly to the longitudinal axis of the apparatus 10. The coupling may for example comprise a knuckle joint.

An extendible mid-section support 32 is coupled between the base section 24 and the mid section 28. The boom support 32 comprises an extendable, e.g. telescopically extendible, support member 34 and further includes, or is in operative association with, a powered actuator 36 arranged to extend and retract the extendible support member 34. Conveniently, the support member 34 comprises a telescopically extendible beam. The actuator 36 may comprise a ram, preferably a double-acting ram, powered in any suitable manner, e.g. hydraulically, electrically or pneumatically. The actuator 36 is operable by a control device (not shown), which may be located on the apparatus 10, or by a wired or wireless remote controller (not shown).

The extendible support 34 is pivotably coupled to the base section 24 and to the mid-section, preferably at respective opposite ends 33, 35. The coupling with the base section 24, which may comprise any suitable conventional coupling or joint, is configured to allow relative pivotable movement between the extendible support 34 and the base section 24 about at least two mutually perpendicular axes, preferably only two mutually perpendicular axes. In the preferred embodiment, the extendible support 34 is pivotable about the two axes that are perpendicular to its longitudinal axis. In the illustrated embodiment, the coupling comprises a respective knuckle joint for each pivot axis but any other conventional coupling, e.g. a ball and socket joint or universal joint, could be used.

Preferably, the other end 35 of the support 34 is coupled to the mid-section 28 by means of any suitable pivotable coupling, preferably one that allows at least two degrees of pivoting freedom. In the illustrated embodiment, an eye-and-pin coupling is used, but any other conventional coupling, e.g. knuckle joints, a ball and socket joint or universal joint, could be used. The mid-section 28 is preferably provided with a spacer member or mounting 37 that projects from the body of the mid-section and is arranged to provide a coupling location for said extendible support 34 that is laterally spaced apart from the longitudinal axis of the mid-section 28. The preferred mounting 37 is dimensioned to space the end 35 of the support 34 far enough from the body of the mid-section to allow the conveyor belt, when fitted, to be unimpeded by the support 34. Advantageously, the mounting 37 creates a lever effect that allows a less powerful actuator 36 to be used than would be required if the end 35 were coupled directly to the body of the mid-section 28.

First and second head section supports 38, 40 each extend between the base section 24 and the head section 26. The head section supports 38, 40 may each comprise a respective support beam or other rigid support member. Advantageously, support 38 is non-extendible (in the direction of its longitudinal axis), or at least is non-extendible during use of the conveyor, i.e. it maintains a substantially constant length as the conveyor support structure 20 moves between its transport and deployed states. Support 40 may be similarly non-extendible during use but is preferably extendible, e.g. telescopically, during use. Optionally, one or both of the supports 38, 40 may be extendable, e.g. telescopically, to facilitate assembly of the conveyor support structure 20. In such cases, however, at supports 38 is preferably locked in a non-extendible state by any suitable locking device, e.g. a pin and socket arrangement (not shown) before use.

In the illustrated example supports 38, 40 are each constructed of two common components. For example support 38 comprises an outer box section incorporating a pivot eye at end 41 and a relatively short adjustable telescoping inner box section incorporating pivot hinge at end 39. For support 38 the inner and outer components are adjusted telescopically in assembly to give the desired overall length and then locked, fixing the length between the pivot points at either end of support 38. For support 40 the same adjustment may be carried out to set the minimum/closed length. However, its inner and outer box section components, or other telescopic components, are preferably free to telescopically extend or retract to facilitate folding. In the preferred embodiment, in the transport and deployed states both supports 38, 40 have substantially the same length, but support 40 is preferably free to extend/retract to facilitate folding under the action of actuator 36. Conveniently, a locking device, e.g. a pin and socket arrangement (not shown, are provided to locking support 40 in its deployed state and so provide means for locking the conveyor support structure in its deployed state.

Each head section support 38, 40 is pivotably coupled to the base section 24 and to the mid-section, preferably at respective opposite ends 39, 41 and 43, 45. The respective couplings with the base section 24, which may comprise any suitable conventional coupling or joint and which are preferably mutually spaced apart, are configured to allow relative pivotable movement between the respective head section support 38, 40 and the base section 24 about at least two mutually perpendicular axes, preferably only two mutually perpendicular axes. In the preferred embodiment, each head section support 38, 40 is pivotable about the two axes that are perpendicular to its longitudinal axis. In the illustrated embodiment, the coupling comprises a respective knuckle joint for each pivot axis but any other conventional coupling, e.g. a ball and socket joint or universal joint, could be used. Preferably, the respective other end 41, 45 of each beam 38, 40 is coupled to the mid-section 28 by means of any suitable pivotable coupling, preferably one that allows at least two degrees of pivoting freedom, and preferably at respective mutually spaced apart locations. In the illustrated embodiment, an eye-and-pin coupling is used, but any other conventional coupling, e.g. knuckle joints, a ball and socket joint or universal joint, could be used.

Preferably, a respective coupling location is provided for each of said support beams 38, 40 that is laterally spaced apart from, and located on opposite sides of, the longitudinal axis of the head section 26, the respective coupling locations preferably being located on a common axis that is substantially perpendicular to the longitudinal axis of the head section 26. To this end, the head section 26 may be provided with a cross piece 46 that projects laterally from opposite sides of the head section 26 and is arranged to provide the respective coupling location for each of said support beams 38, 40. The cross piece 46 is preferably substantially perpendicularly disposed with respect to the longitudinal axis of the head section 26. Conveniently, roller support 54 serves as, or includes, the cross piece 46.

Movement of the conveyor support structure 20 between its transport and deployed states is effected by extension and retraction of the actuator 36. Guide means for guiding and supporting the mid section support 32 may be constructed and operated such that: the corresponding extension and retraction of the mid-section support 32 causes the mid-section 28 to pivot with respect to the base section 24 and determines the path of the mid-section 28 as it moves between the transport and deployed states. One or both of the head sections supports 38, 40 determines the path of the head section 26 as it moves between the transport and deployed states, and so one or both of the supports 38, 40 may be said to form at least part of the guide means. In the preferred embodiment, it is particularly the head section support 38, which may be regarded as the main head section support, that determines the path of the head section 26 as it moves between the transport and deployed states. To this end, the support 38 is fixed in length during movement. The support 38 is preferably coupled to the base section 24 at substantially the same location as the mid-section support 32. This creates a substantially triangular relationship between the respective couplings of the mid-section support 32 and the head section support 38 to the mid-section 28 and head section 26 respectively, which in turn provides relatively stable movement of the head section 26. The head section support 40 provides support to the head section 26 particularly when the head section 26 adopts the transport or deployed states. Optionally, the head section support 40 may be omitted. In such embodiments, it is preferred to position the coupling of the head section support 38 to the head section 26 at a location that is substantially below (or above) the longitudinal axis of the conveyor structure 20 when deployed, and substantially centrally located.

In the preferred embodiment, the head section supports 38, 40 are arranged to cross one another between their respective couplings to the base section 24 and the mid-section 28. To facilitate this, it is preferred that one or both of the head section supports 38, 40 is shaped, e.g. bent or bowed, to allow a mutual crossover when the supports are substantially co-planar.

The base section 24 has a transverse axis and a longitudinal axis, which are indicated in FIG. 5 as T and L respectively. The longitudinal axis L runs substantially co-incident with or substantially parallel with the longitudinal axis of the support structure 20 when deployed. The transverse axis T runs perpendicularly to the longitudinal axis L and across the conveyor belt, when fitted. When the base section 24 is mounted on a side of the apparatus 10, the transverse axis T is typically substantially parallel with the longitudinal axis of the apparatus 10. In use, the transverse axis T is usually substantially parallel with the ground (not shown) supporting the apparatus 10, i.e. substantially horizontal when the apparatus 10 is located on substantially horizontal ground.

When the support structure 20 is in the transport state (FIGS. 1 to 3), the mid-section 28 (or at least it axis that extends from end to end 27, 30) is obliquely disposed with respect to the transverse axis T of the base section 24, preferably at an angle of between 35° and 55°, more preferably at an angle of between 40° and 50°, and most preferably at approximately or substantially 45°. It is further preferred that, in the transport state, the mid-section 28 lies substantially in a plane that is substantially parallel with the side (or end as applicable) of the apparatus 10 on which it is mounted, and is advantageously folded substantially against the side (or end) of the apparatus 10. Typically, in the transport state, the mid-section 28 lies substantially in a plane that is substantially perpendicular to the ground on which the apparatus 10 is located, i.e. is substantially vertical when the apparatus 10 is located on substantially horizontal ground. In the preferred embodiment, the mid-section 28 extends from the base section 24 in a direction that is, is use, upwards, i.e. away from the ground surface on which the apparatus 10 is located. In alternative embodiments, the mid-section 28 may extend downwards.

Advantageously, in the transport state, the head section 26, preferably the head section supports 38, 40 and preferably also the mid-section support 32, lie in substantially the same plane as the mid-section 28. This can be achieved by locating the respective pivotable couplings of the head section supports 38, 40 and preferably also of the mid-section support 32 substantially in said plane. Hence, when folded into the transport state, the conveyor support structure 20 is substantially flat and is suitable for location adjacent or substantially against the apparatus 10 and so does not project substantially beyond the apparatus 10 in a lateral direction.

In the deployed state (FIG. 5), the boom structure 22 projects laterally from the apparatus 10 and may for example extend substantially perpendicularly to the longitudinal axis of the apparatus 10. Preferably, in the deployed state, the respective locations of the coupling of the mid-section support 32 to the base section 24 and to the head section 26 (via the spacer 37 in this embodiment) are substantially equidistant from the longitudinal axis of the boo structure 22 in the transverse direction T. This allows the mid-section support 32 to bear the load imparted through the mid-section 28 substantially along its axis and the actuator 36 can more easily lift the mid-section 28 than if it were obliquely disposed. It is also preferred that, in the deployed state, the mid-section support 32 (at least one or other of the actuator 36 and the support 34, but preferably both), adopts a retracted state, preferably a fully retracted state. This reduces the possibility that the mid-section support 32 will become damaged or impeded during use by, in particular, the ingress of dirt.

The location of the respective coupling between the head section supports 38, 40 and the head section 26 are spaced apart from the respective pivotable couplings between the head section supports 38, 40 and the base section 24 in a direction perpendicular to the axes T and L, e.g. above in the preferred embodiment. This creates a substantially triangular relationship between the locations of the respective couplings at both ends of the head section supports 38, 40 and the coupling between the mid-section 28 and the base section 24 when viewed along axis T, allowing the head section supports 38, 40 to support the boom structure 22.

Advantageously, the respective pivotable couplings between the head section supports 38, 40 and the base section 24 are mutually spaced apart, one on either side of the coupling between the mid-section 28 and the base section 24, in the direction of transverse axis T, preferably substantially equidistantly from the mid-section coupling, and are further spaced apart from the mid-section coupling in a direction perpendicular to the axes T and L, e.g. below the mid-section coupling in the preferred embodiment. This creates a substantially triangular relationship between the locations of the respective couplings when viewed along axis L. In the deployed state, the respective couplings at the other ends of the head supports 38, 40 are preferably also spaced apart in the direction of transverse axis T, preferably substantially equidistantly spaced from the head support 26.

When the conveyor support structure 20 is deployed, the head section supports 38, 40 cross one another. The preferred equidistant arrangement of the coupling locations with respect to the boom structure 22 causes the head section supports 38, 40 to cross at a location that is below and substantially in register with the longitudinal axis of the boom structure 22 and causes the head supports 38, 40 to be substantially symmetrically arranged with respect to the boom structure 22 when deployed. Advantageously, the respective spacings between the couplings and the mid-section/head section in direction T are substantially the same. This causes the crossover location to be substantially at the mid-points of the respective head supports 38, 40.

In the example illustrated, the pivot points at 45 and 41 are substantially equidistant from the centre line of head section 26 and that the pivot points at 39 and 43 are substantially equidistant from the centre line of base section 24. However it is not necessary for the supports 38, 40 to be symmetrically orientated along the centre line of the conveyor support structure 20 in the deployed state.

The preferred cross-over arrangement of supports 38, 40 may be offset from the centre line of the deployed boom structure 22. The crossed support configuration does not require supports 38, 40 to have the same closed lengths. Symmetry, although preferable from a view to standardization of parts and aesthetics, is not necessary to satisfy successful operation of the folding mechanism.

Because the coupling locations at each end of the head supports 38, 40 are spaced apart in substantially the same direction, i.e. the transverse direction T, the coupling locations lie in substantially the same plane when the boom structure 22 is deployed and so too do the head supports 38, 40. To allow the head supports 38, 40 to cross, one or both of them comprises a bend, bow or other suitable deformation.

The respective positions of the boom structure 22 in the deployed state and in the transport state may be determined by any convenient means, for example the provision of one or more mechanical stops (not shown) for halting movement of one or more of the mid-section 26, the mid-section support 32 and/or the head section supports 38, 40, and/or by configuration of one or more of the respective pivotable couplings of one or more of the mid-section 26, the mid-section support 32 and/or the head section supports 38, 40, to restrict the extent of pivoting movement about one or more respective axis.

Optionally, the mid-section support 32 includes a locking device 64 for locking the support 32 in its extended or retracted states corresponding to the transport or deployed states of the conveyor support 20. By way of example, the locking device 64 may comprise a pin and socket arrangement provided in the support 34.

Preferred inclinations of the mid-section 28 with respect to the transverse axis T, and especially the preferred inclination of substantially 45°, is advantageous for the following reasons. A symmetry is created that allows in particular the head section support 38 to be non-extending, i.e. of fixed length, during movement of the conveyor support structure 20 between the deployed and transport states. Fixed length support members, such as fixed length beams, are advantageous over extendible members, e.g. telescopic beams, since they are less susceptible of failure, for example as result of the ingress of dirt. In addition, fixed length members do not require actuators to effect or assist their extension and retraction. Not only does this reduce cost and weight, but actuators are susceptible of failure, for example as a result of the ingress of dirt or other mechanical failure, and so their avoidance is desirable if possible. Moreover, the head support members 38, 40 may be of substantially equal length, which reduces the number of different components that are required to manufacture the support structure 20.

In alternative embodiments (not illustrated), the respective pivotable couplings of any one or more of the mid-section support 32, the head section supports 38, 40 to the base section 24 may be located above, in use, the location of pivotable coupling of the mid-section to the base section 24. This results in the mid-section support 32, the head section support 38 and/or the head section support 40, as applicable, to be located substantially above the boom structure 22 when deployed. This arrangement may be adopted either when the mid-section 28 projects in an upwards direction from the base section 24 (as per the illustrated embodiment), or in alternative embodiments where the mid-section 28 projects in a downwards direction from the base section 24.

In alternative embodiments, the mid-section 28 may extend downwards, in use, from the base section 24, i.e. in a direction towards the ground. In such embodiments, the respective pivotable couplings of any one or more of the mid-section support 32, the head section supports 38, 40 to the base section 24 may be located above, in use, the location of pivotable coupling of the mid-section to the base section 24. Alternatively, the respective pivotable couplings to the base section may be substantially as shown in the drawings. The adaptation of the mid-section 28 and head section 26 for receiving a conveyor belt or other conveyor is adjusted, as would be apparent to a skilled person, in comparison with that illustrated in the drawings to account for the fact that the obverse face of the conveyor faces outwardly from the apparatus 10 when in the transport state (as opposed to inwardly in the illustrated embodiment). Otherwise the conveyor support structure may be substantially the same as described herein.

It will be understood that in alternative embodiments, any suitable part of the apparatus 10 may serve as the base section for the purposes of coupling one or more of mid-section 28, the mid-section support 32 or the head section supports 38, 40 thereto.

In further alternative embodiments, the head section supports 28, 30 may be uncrossed in which case one is longer than the other. Depending on the geometry of the embodiment, one or both of the head section supports may be longitudinally extendible, e.g. telescopically, and may optionally include a powered actuator, e.g. a ram, for effecting or assisting extension and retraction. Alternatively still, a single head section support may be provided which, depending on the geometry of the embodiment, may be longitudinally extendible, e.g. telescopically, and may optionally include a powered actuator, e.g. a ram, for effecting or assisting extension and retraction.

As can best be seen from FIGS. 1 and 2, in the transport, or stored, state, the angular inclination of the mid-section 28 offsets the head section 28 with respect to the base section 24 to make room for the auxiliary conveyor 18 below the head section 26 when stored, i.e. in the transport state. The conveyor support structure 20 may therefore be said to form part of a dual or multi segment offset stored conveyor comprising: a proximal segment (mid-section) coupled in close proximity to the frame of the apparatus 10, and a distal segment (head section), which is distal to said frame (when deployed) and substantially parallel to the longitudinal axis of the apparatus (when stored); means for guiding and supporting said dual segment offset stored conveyor from a use position which is preferably substantially orthogonal to said longitudinal direction to a stored position where said proximal segment is oriented at a substantially 45 degree angle with respect to said longitudinal direction. As a result, said distal segment is offset with respect to said auxiliary conveyor.

The invention is not limited to the embodiment described herein, which may be modified without departing from the scope of the invention.

The invention claimed is:

1. A conveyor support structure for a material processing apparatus, the conveyor support structure comprising
a base;
a boom structure pivotable with respect to the base between a transport state, in which said boom structure is substantially disposed in a first plane, and a deployed state, in which said boom structure is substantially disposed in a second plane, said second plane being non-parallel with said first plane, wherein the boom structure comprises
a mid-section pivotably coupled to the base, and
a head section pivotably coupled to the mid-section;
a mid-section support pivotably coupled to the base and to the mid-section, the mid-section support being extendible and comprising a powered actuator for effecting extension and retraction thereof; and
at least one head section support pivotably coupled to the base and to the head section for guiding and supporting said head section as said boom structure is moved between said deployed and transport states,
wherein, when said boom structure is in said transport state, said mid-section is substantially disposed in said first plane and extends obliquely from said base.

2. A conveyor support structure as claimed in claim 1, wherein said at least one head section support is non-extending as said boom structure is moved between said deployed and transport states.

3. A conveyor support structure as claimed in claim 2, wherein said at least one head section support is configured to determine the path of said head section during movement of said boom structure between said transport and deployed states.

4. A conveyor support structure as claimed in claim 2, wherein said at least one head section support and said mid-section support are pivotably coupled to said base at adjacent locations.

5. A conveyor support as claimed in claim 2, wherein said at least one head section support is pivotably coupled to the base at a location that lies substantially in said first plane.

6. A conveyor support as claimed in claim 2, wherein said at least one head section support is pivotably coupled to the head section at a location that lies substantially in said first plane when said boom structure is in said transport state.

7. A conveyor support structure as claimed in claim 2, wherein any one or more of the respective locations at which said mid-section support and said at least one head section support are pivotably coupled to said base are below, in use, the respective location at which said mid-section is coupled to said base.

8. A conveyor support structure as claimed in claim 2, wherein any one or more of the respective locations at which said mid-section support and said at least one head section support are pivotably coupled to said base are above, in use, the respective location at which said mid-section is coupled to said base.

9. A conveyor support structure as claimed in claim 1, wherein, when said boom structure is in said transport state, said mid-section extends obliquely from said base at an angle of between approximately 35° and approximately 55°, preferably between approximately 40° and approximately 50°, and most preferably substantially 45° from a transverse axis of said base.

10. A conveyor support structure as claimed in claim 1, wherein said mid-section support is pivotably coupled to the base at a location that lies substantially in said first plane.

11. A conveyor support as claimed in claim 1, wherein said mid-section support pivotably coupled to the mid-section at a location that lies substantially in said first plane when said boom structure is in said transport state.

12. A conveyor support structure as claimed in claim 1, wherein said at least one head section support comprises a second head section support, and wherein said first and second head supports are arranged to cross one another between said base and said head section.

13. A conveyor support structure as claimed in claim 12, wherein said first and second head section supports are substantially the same length.

14. A conveyor support structure as claimed in claim 12, wherein said first and second head supports are configured to lie substantially in a common plane when said boom structure adopts at least one of said transport or deployed states.

15. A conveyor support structure as claimed in claim 12, wherein at least one of said first and second head supports is shaped to include a bent portion located to facilitate said crossing of the first and second head supports.

16. A conveyor support structure as claimed in claim 12, wherein said first and second head supports are pivotably coupled to said base at respective locations that are mutually spaced apart in a direction parallel with a transverse axis of the base.

17. A conveyor support structure as claimed in claim 16, wherein said respective locations are on opposite sides of the location at which said mid-section is coupled to said base in said transverse direction.

18. A conveyor support structure as claimed in claim 17, wherein said respective locations are substantially equidistant from the location at which said mid-section is coupled to said base in said transverse direction.

19. A conveyor support structure as claimed in claim 12, wherein said first and second head supports are pivotably coupled to said head section at respective locations that are mutually spaced apart in a direction perpendicular to said longitudinal axis, parallel with said first plane when the boom structure is in the transport state and parallel with said second plane when the boom structure is in the deployed state.

20. A conveyor support structure as claimed in claim 19, wherein said respective locations are on opposite sides of said longitudinal axis.

21. A conveyor support structure as claimed in claim 20, wherein said respective locations are substantially equidistant from said longitudinal axis.

22. A conveyor support structure as claimed in claim 1, wherein said at least one head section support is pivotably coupled to the base at a location that is spaced apart from the location at which said mid-section is coupled to said base in a direction parallel with a transverse axis of the base.

23. A conveyor support structure as claimed in claim 1, wherein said at least one head section support is pivotably coupled to the head section at a location that is spaced apart from the longitudinal axis of the head section in a direction perpendicular to said longitudinal axis, parallel with said first plane when the boom structure is in the transport state and parallel with said second plane when the boom structure is in the deployed state.

24. A conveyor support structure as claimed in claim 1, wherein said at least one head section support is pivotably coupled to the base at a location that is spaced apart from the location at which said mid-section is coupled to said base in a direction perpendicular to a transverse axis of the base and perpendicular to the longitudinal axis of the boom structure when deployed.

25. A conveyor support structure as claimed in claim 24, wherein said at least one head section support and said mid-section support are pivotably coupled to the base at respective locations on the same side of said mid-section coupling location with respect to said transverse axis.

26. A conveyor support structure as claimed in claim 24, wherein at least one head section support and said mid-section support are pivotably coupled to the base at respective locations that are spaced apart from said mid-section coupling location by substantially the same distance.

27. A conveyor support structure as claimed in claim 1, wherein said mid-section support is pivotably coupled to the base at a location that is spaced apart from the location at which said mid-section is coupled to said base in a direction perpendicular to a transverse axis of the base and perpendicular to the longitudinal axis of the boom structure when deployed.

28. A conveyor support structure as claimed in claim 1, wherein, when said boom structure is in said deployed state, said at least one head section support is substantially disposed in a plane that is non-parallel with said second plane.

29. A conveyor support structure as claimed in claim 1, wherein said mid-section projects, in use, upwardly from said base at least when said boom structure is in said transport state.

30. A conveyor support structure as claimed in claim 1, wherein said mid-section projects, in use, downwardly from said base at least when said boom structure is in said transport state.

31. A material processing apparatus comprising a conveyor support structure as claimed in claim 1.

32. A material processing apparatus as claimed in claim 31, wherein said conveyor support structure is located at a side of the processing apparatus, and wherein, in said transport state, said boom structure is folded substantially against said side, and in said deployed state, said boom structure projects outwardly from said side.

33. A material processing apparatus as claimed in claim 32, wherein, in said transport state, the longitudinal axis of said beam structure is substantially parallel with the longitudinal axis of said apparatus.

34. A material processing apparatus as claimed in claim 31, wherein said conveyor support structure is located at an end of an aggregate processing apparatus, and wherein, in said transport state, said boom structure is folded substantially against said end, and in said deployed state, said boom structure projects outwardly from said end.

35. A material processing apparatus as claimed in claim 31, wherein, when the boom structure is in said transport state, said first plane is substantially perpendicular to the ground surface on which said apparatus is located.

36. A material processing apparatus as claimed in claim 31, further including an auxiliary conveyor coupled to said apparatus and storable in a transport state in which it extends substantially parallel with the longitudinal axis of said apparatus and wherein, when said conveyor support structure is in its transport state, said head section is substantially parallel with said auxiliary conveyor.

37. A conveyor support structure for a material processing apparatus, the conveyor support structure comprising
 a base;
 a boom structure pivotable with respect to the base between a transport state, in which said boom structure is substantially disposed in a first plane, and a deployed state, in which said boom structure is substantially disposed in a second plane, said second plane being non-parallel with said first plane, wherein the boom structure comprises
  a mid-section pivotably coupled to the base, and
  a head section pivotably coupled to the mid-section;
 a mid-section support pivotably coupled to the base and to the mid-section, the mid-section support being extendible and comprising a powered actuator for effecting extension and retraction thereof; and
 at least one head section support pivotably coupled to the base and to the head section for guiding and supporting said head section as said boom structure is moved between said deployed and transport states,
 wherein, when said boom structure is in said transport state, said mid-section is substantially disposed in said first plane and extends obliquely from said base,
 and wherein, when said boom structure is in said transport state, said mid-section extends obliquely from said base at an angle of between approximately 35° and approximately 55°, preferably between approximately 40° and approximately 50°, and most preferably substantially 45° from a transverse axis of said base.

38. A material processing apparatus comprising a conveyor support structure as claimed in claim 37.

* * * * *